(12) United States Patent
Li et al.

(10) Patent No.: US 12,298,399 B2
(45) Date of Patent: May 13, 2025

(54) RECEIVE PATH FOR LiDAR SYSTEM

(71) Applicant: Innovusion Ireland Limited, Los Altos, CA (US)

(72) Inventors: Jim Li, Los Altos, CA (US); Yimin Li, Los Altos, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 894 days.

(21) Appl. No.: 16/283,563

(22) Filed: Feb. 22, 2019

(65) Prior Publication Data

US 2019/0257924 A1 Aug. 22, 2019

Related U.S. Application Data

(60) Provisional application No. 62/634,084, filed on Feb. 22, 2018.

(51) Int. Cl.
*G01S 17/89* (2020.01)
*G01S 7/481* (2006.01)
*G01S 17/10* (2020.01)

(52) U.S. Cl.
CPC ............ *G01S 17/89* (2013.01); *G01S 7/4816* (2013.01); *G01S 7/4818* (2013.01); *G01S 17/10* (2013.01)

(58) Field of Classification Search
CPC ...... G01S 17/89; G01S 7/4816; G01S 7/4818; G01S 17/10
See application file for complete search history.

(56) References Cited

U.S. PATENT DOCUMENTS

| | | | |
|---|---|---|---|
| 3,897,150 A | 7/1975 | Bridges et al. | |
| 4,119,362 A * | 10/1978 | Holzman | G02B 6/32 385/74 |
| 4,464,048 A | 8/1984 | Farlow | |
| 4,676,586 A | 6/1987 | Jones et al. | |

(Continued)

FOREIGN PATENT DOCUMENTS

| | | |
|---|---|---|
| CN | 204216401 U | 3/2015 |
| CN | 204758260 U | 11/2015 |

(Continued)

OTHER PUBLICATIONS

Laser damage threshold—Galvo Mirror vs Polygon mirror (Year: 2021).*

(Continued)

*Primary Examiner* — Isam A Alsomiri
*Assistant Examiner* — Sanjida Naser
(74) *Attorney, Agent, or Firm* — MASCHOFF BRENNAN; Elaine K. Lee; Liang Huang

(57) ABSTRACT

In accordance with some embodiments, a light detection and ranging (LiDAR) system comprises: a light source configured to generate a pulse signal from the LiDAR system; one or more mirrors configured to steer a returned light pulse associated with the transmitted pulse signal along an optical receive path; a field lens positioned along the optical receive path, wherein the field lens is configured to redirect the returned light pulse; a fiber having a receiving end configured to receive the returned light pulse from the field lens along the optical receive path; and a light detector configured to receive the returned light pulse from an end of the fiber opposite the receiving end.

20 Claims, 8 Drawing Sheets

(56) References Cited

U.S. PATENT DOCUMENTS

| | | | |
|---|---|---|---|
| 5,006,721 A * | 4/1991 | Cameron | G01S 7/4817 |
| | | | 250/559.22 |
| 5,157,451 A | 10/1992 | Taboada et al. | |
| 5,319,434 A | 6/1994 | Croteau et al. | |
| 5,336,900 A * | 8/1994 | Peters | G01S 7/489 |
| | | | 250/226 |
| 5,369,661 A | 11/1994 | Yamaguchi et al. | |
| 5,442,358 A | 8/1995 | Keeler | |
| 5,504,731 A * | 4/1996 | Lee | G11B 7/0901 |
| 5,546,188 A | 8/1996 | Wangler et al. | |
| 5,579,153 A | 11/1996 | Laming et al. | |
| 5,657,077 A | 8/1997 | Deangelis | |
| 5,793,491 A | 8/1998 | Wangler et al. | |
| 5,838,239 A | 11/1998 | Stern et al. | |
| 5,864,391 A | 1/1999 | Hosokawa et al. | |
| 5,926,259 A | 7/1999 | Bamberger | |
| 5,936,756 A | 8/1999 | Nakajima | |
| 6,163,378 A | 12/2000 | Khoury | |
| 6,317,202 B1 | 11/2001 | Hosokawa et al. | |
| 6,594,000 B2 | 7/2003 | Green | |
| 6,650,404 B1 | 11/2003 | Crawford | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,345,271 B2 | 3/2008 | Boehlau et al. | |
| 7,440,084 B2 | 10/2008 | Kane | |
| 7,440,175 B2 | 10/2008 | Di Teodoro | |
| 7,489,865 B2 | 2/2009 | Varshneya | |
| 7,576,837 B2 | 8/2009 | Liu et al. | |
| 7,830,527 B2 | 11/2010 | Chen | |
| 7,835,068 B1 | 11/2010 | Brooks | |
| 7,847,235 B2 | 12/2010 | Krupkin | |
| 7,880,865 B2 | 2/2011 | Tanaka et al. | |
| 7,936,448 B2 | 5/2011 | Albuquerque | |
| 7,969,558 B2 | 6/2011 | Hall | |
| 7,982,861 B2 | 7/2011 | Abshire | |
| 8,072,582 B2 | 12/2011 | Meneely | |
| 8,471,895 B2 | 6/2013 | Banks | |
| 8,736,818 B2 | 5/2014 | Weimer | |
| 8,749,764 B2 | 6/2014 | Hsu | |
| 8,812,149 B2 | 8/2014 | Doak | |
| 8,994,928 B2 | 3/2015 | Shiraishi | |
| 9,048,616 B1 | 6/2015 | Robinson | |
| 9,085,243 B2 | 6/2015 | Asobe et al. | |
| 9,086,273 B1 | 7/2015 | Gruver | |
| 9,194,701 B2 | 11/2015 | Bösch | |
| 9,255,790 B2 | 2/2016 | Zhu | |
| 9,300,321 B2 | 3/2016 | Zalik | |
| 9,304,316 B2 | 4/2016 | Weiss et al. | |
| 9,316,724 B2 | 4/2016 | Gehring et al. | |
| 9,354,485 B2 | 5/2016 | Fermann | |
| 9,465,175 B2 * | 10/2016 | Shi | G02B 5/04 |
| 9,510,505 B2 | 12/2016 | Halloran | |
| 9,575,184 B2 | 2/2017 | Gilliland | |
| 9,605,998 B2 | 3/2017 | Nozawa | |
| 9,621,876 B2 | 4/2017 | Federspiel | |
| 9,638,799 B2 | 5/2017 | Goodwin | |
| 9,696,426 B2 | 7/2017 | Zuk | |
| 9,702,966 B2 | 7/2017 | Batcheller | |
| 9,804,264 B2 | 10/2017 | Villeneuve et al. | |
| 9,810,786 B1 | 11/2017 | Welford et al. | |
| 9,812,838 B2 | 11/2017 | Villeneuve et al. | |
| 9,823,353 B2 | 11/2017 | Eichenholz et al. | |
| 9,857,468 B1 | 1/2018 | Eichenholz et al. | |
| 9,869,754 B1 | 1/2018 | Campbell et al. | |
| 9,879,990 B2 | 1/2018 | Klepsvik et al. | |
| 9,880,263 B2 | 1/2018 | Droz | |
| 9,880,278 B2 | 1/2018 | Uffelen et al. | |
| 9,885,778 B2 | 2/2018 | Dussan | |
| 9,897,689 B2 | 2/2018 | Dussan | |
| 9,915,726 B2 | 3/2018 | Bailey | |
| 9,927,915 B2 | 3/2018 | Frame | |
| 9,958,545 B2 | 5/2018 | Eichenholz et al. | |
| 9,989,629 B1 * | 6/2018 | LaChapelle | G01S 7/4816 |
| 10,003,168 B1 | 6/2018 | Villeneuve | |
| 10,007,001 B1 | 6/2018 | LaChapelle et al. | |
| 10,012,732 B2 | 7/2018 | Eichenholz et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,078,133 B2 | 9/2018 | Dussan | |
| 10,094,925 B1 | 10/2018 | LaChapelle | |
| 10,157,630 B2 | 12/2018 | Vaughn | |
| 10,191,155 B2 | 1/2019 | Curatu | |
| 10,215,847 B2 | 2/2019 | Scheim | |
| 10,267,898 B2 | 4/2019 | Campbell et al. | |
| 10,295,656 B1 | 5/2019 | Li et al. | |
| 10,310,058 B1 | 6/2019 | Campbell et al. | |
| 10,324,170 B1 | 6/2019 | Enberg, Jr. et al. | |
| 10,324,185 B2 | 6/2019 | McWhirter et al. | |
| 10,393,877 B2 | 8/2019 | Hall et al. | |
| 10,429,495 B1 | 10/2019 | Wang et al. | |
| 10,444,356 B2 | 10/2019 | Wu et al. | |
| 10,451,716 B2 | 10/2019 | Hughes et al. | |
| 10,466,342 B1 | 11/2019 | Zhu et al. | |
| 10,502,831 B2 | 12/2019 | Eichenholz | |
| 10,509,112 B1 | 12/2019 | Pan | |
| 10,520,602 B2 | 12/2019 | Villeneuve et al. | |
| 10,557,923 B2 | 2/2020 | Watnik | |
| 10,571,567 B2 | 2/2020 | Campbell et al. | |
| 10,578,720 B2 | 3/2020 | Hughes et al. | |
| 10,591,600 B2 | 3/2020 | Villeneuve | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,852,398 B2 | 12/2020 | Yu et al. | |
| 10,908,262 B2 | 2/2021 | Dussan | |
| 10,908,265 B2 | 2/2021 | Dussan | |
| 10,908,268 B2 | 2/2021 | Zhou et al. | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,194,048 B1 | 12/2021 | Burbank et al. | |
| 2002/0136251 A1 | 9/2002 | Green | |
| 2002/0149757 A1 | 10/2002 | Kelsey et al. | |
| 2004/0135992 A1 | 7/2004 | Munro | |
| 2005/0013535 A1 * | 1/2005 | Popescu | A61B 6/56 |
| | | | 398/116 |
| 2005/0033497 A1 | 2/2005 | Stopczynski | |
| 2005/0190424 A1 | 9/2005 | Reichenbach et al. | |
| 2005/0195383 A1 | 9/2005 | Breed et al. | |
| 2005/0232541 A1 * | 10/2005 | Mihailov | G02B 6/021 |
| | | | 385/37 |
| 2006/0071846 A1 | 4/2006 | Yanagisawa et al. | |
| 2006/0132752 A1 | 6/2006 | Kane | |
| 2007/0091948 A1 | 4/2007 | Di Teodoro | |
| 2007/0188735 A1 * | 8/2007 | Braunecker | G01S 7/4812 |
| | | | 356/4.09 |
| 2007/0216995 A1 | 9/2007 | Bollond et al. | |
| 2008/0174762 A1 | 7/2008 | Liu et al. | |
| 2008/0193135 A1 | 8/2008 | Du et al. | |
| 2009/0010644 A1 | 1/2009 | Varshneya | |
| 2009/0028193 A1 | 1/2009 | Islam | |
| 2009/0051926 A1 | 2/2009 | Chen | |
| 2009/0059201 A1 | 3/2009 | Willner | |
| 2009/0067453 A1 | 3/2009 | Mizuuchi et al. | |
| 2009/0142066 A1 * | 6/2009 | Leclair | G01S 7/4818 |
| | | | 398/139 |
| 2009/0147239 A1 | 6/2009 | Zhu | |
| 2009/0237639 A1 * | 9/2009 | Shinozaki | G01S 17/42 |
| | | | 356/4.01 |
| 2009/0262760 A1 | 10/2009 | Krupkin | |
| 2009/0316134 A1 | 12/2009 | Michael et al. | |
| 2010/0006760 A1 | 1/2010 | Lee | |
| 2010/0020306 A1 | 1/2010 | Hall | |
| 2010/0020377 A1 | 1/2010 | Brochers et al. | |
| 2010/0027602 A1 | 2/2010 | Abshire | |
| 2010/0045965 A1 | 2/2010 | Meneely | |
| 2010/0053715 A1 | 3/2010 | O'Neill et al. | |
| 2010/0128109 A1 | 5/2010 | Banks | |

(56) References Cited

U.S. PATENT DOCUMENTS

| | | |
|---|---|---|
| 2010/0271614 A1 | 10/2010 | Albuquerque |
| 2011/0181864 A1 | 7/2011 | Schmitt et al. |
| 2011/0216792 A1 | 9/2011 | Chann et al. |
| 2012/0038903 A1 | 2/2012 | Weimer |
| 2012/0124113 A1 | 5/2012 | Zalik |
| 2012/0162749 A1 | 6/2012 | Gusev et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu |
| 2013/0293946 A1 | 11/2013 | Fermann |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0168631 A1* | 6/2014 | Haslim ............... G02B 6/262 356/4.01 |
| 2014/0226140 A1 | 8/2014 | Chuang et al. |
| 2014/0347650 A1 | 11/2014 | Bosch |
| 2014/0350836 A1 | 11/2014 | Stettner et al. |
| 2015/0078123 A1 | 3/2015 | Batcheller |
| 2015/0084805 A1 | 3/2015 | Dawber |
| 2015/0109603 A1 | 4/2015 | Kim et al. |
| 2015/0116692 A1 | 4/2015 | Zuk |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin |
| 2016/0003946 A1 | 1/2016 | Gilliland |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran |
| 2016/0117048 A1 | 4/2016 | Frame |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0273034 A1 | 9/2016 | Lundquist et al. |
| 2016/0291134 A1 | 10/2016 | Droz |
| 2016/0313445 A1 | 10/2016 | Bailey |
| 2016/0327646 A1 | 11/2016 | Scheim |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz |
| 2017/0307738 A1 | 10/2017 | Schwarz et al. |
| 2017/0365105 A1 | 12/2017 | Rao et al. |
| 2018/0031678 A1 | 2/2018 | Singer et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li |
| 2018/0188358 A1 | 7/2018 | Li |
| 2018/0188371 A1 | 7/2018 | Bao |
| 2018/0210084 A1 | 7/2018 | Zwölfer et al. |
| 2018/0275274 A1 | 9/2018 | Bao |
| 2018/0284241 A1 | 10/2018 | Campbell et al. |
| 2018/0284242 A1* | 10/2018 | Campbell ............... G01S 17/42 |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li |
| 2019/0107607 A1 | 4/2019 | Danziger |
| 2019/0107623 A1 | 4/2019 | Campbell et al. |
| 2019/0120942 A1 | 4/2019 | Zhang |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang |
| 2019/0265336 A1 | 8/2019 | Zhang |
| 2019/0265337 A1 | 8/2019 | Zhang |
| 2019/0265339 A1 | 8/2019 | Zhang |
| 2019/0273385 A1 | 9/2019 | Zediker et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0341124 A1 | 10/2020 | Yu et al. |
| 2020/0400798 A1 | 12/2020 | Rezk et al. |
| 2021/0088630 A9 | 3/2021 | Zhang |

FOREIGN PATENT DOCUMENTS

| | | | |
|---|---|---|---|
| CN | 204885804 U | 12/2015 | |
| CN | 107664763 A * | 2/2018 | ............ G01S 17/08 |
| CN | 108132472 A | 6/2018 | |
| CN | 207457508 U | 6/2018 | |
| CN | 207557465 U | 6/2018 | |
| CN | 208314210 U | 1/2019 | |
| CN | 208421228 U | 1/2019 | |
| CN | 208705506 U | 4/2019 | |
| CN | 106597471 B | 5/2019 | |
| CN | 209280923 U | 8/2019 | |
| CN | 108445468 B | 11/2019 | |
| CN | 110031823 B | 3/2020 | |
| CN | 108089201 B | 4/2020 | |
| CN | 109116331 B | 4/2020 | |
| CN | 109917408 B | 4/2020 | |
| CN | 109116366 B | 5/2020 | |
| CN | 109116367 B | 5/2020 | |
| CN | 110031822 B | 5/2020 | |
| CN | 211655309 U | 10/2020 | |
| CN | 109188397 B | 11/2020 | |
| CN | 109814086 B | 11/2020 | |
| CN | 109917348 B | 11/2020 | |
| CN | 110492856 B | 11/2020 | |
| CN | 110736975 B | 11/2020 | |
| CN | 109725320 B | 12/2020 | |
| CN | 110280284 B | 12/2020 | |
| CN | 110780283 8 | 1/2021 | |
| CN | 110784220 B | 2/2021 | |
| CN | 212623082 U | 2/2021 | |
| CN | 110492349 B | 3/2021 | |
| CN | 109950784 B | 5/2021 | |
| CN | 213182011 U | 5/2021 | |
| CN | 213750313 U | 7/2021 | |
| CN | 214151038 U | 9/2021 | |
| CN | 109814082 B | 10/2021 | |
| CN | 113491043 A | 10/2021 | |
| CN | 214795200 U | 11/2021 | |
| CN | 214795206 0 | 11/2021 | |
| CN | 214895784 U | 11/2021 | |
| CN | 214895810 U | 11/2021 | |
| CN | 215641806 U | 1/2022 | |
| CN | 112639527 B | 2/2022 | |
| CN | 215932142 U | 3/2022 | |
| CN | 112578396 B | 4/2022 | |
| EP | 0 757 257 A2 | 5/2002 | |
| EP | 1 923 721 A1 | 5/2008 | |
| EP | 2 157 445 A2 | 2/2010 | |
| EP | 2 395 368 A1 | 12/2011 | |
| EP | 2 889 642 A1 | 7/2015 | |
| GB | 1 427 164 A | 3/1976 | |
| GB | 2000411 A | 1/1979 | |
| JP | 2007144667 A | 6/2007 | |
| JP | 2010035385 A | 2/2010 | |
| JP | 2012-26921 A | 2/2012 | |
| JP | 2017-003347 A | 1/2017 | |

(56) References Cited

FOREIGN PATENT DOCUMENTS

| JP | 2017-138301 A | 8/2017 |
|---|---|---|
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018175990 A1 | 9/2018 |
| WO | 2018182812 A2 | 10/2018 |
| WO | 2019079642 A1 | 4/2019 |
| WO | WO2019165095 A1 | 8/2019 |
| WO | WO2019165289 A1 | 8/2019 |
| WO | WO2019165294 A1 | 8/2019 |
| WO | 2020013890 A2 | 1/2020 |

OTHER PUBLICATIONS

Parabolic Mirror: How It Works & Types (w/ Examples (Year: 2021).*
Mirror (Year: 2021).*
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., six pages.
International Preliminary Report on Patentability and Written Opinion of the International Searching Authority, mailed Sep. 18, 2018, for PCT Application No. PCT/US2018/12116, filed Jan. 2, 2018, 11 pages.
International Preliminary Report on Patentability, and Written Opinion dated Jul. 9, 2019, for PCT Application No. PCT/US2018/012703, filed Jan. 5, 2018, 10 pages.
International Preliminary Report on Patentability, dated Jul. 9, 2019, for PCT Application No. PCT/US2018/012704, filed Jan. 5, 2018, 7 pages.
International Preliminary Report on Patentability, dated Jul. 9, 2019, for PCT Application No. PCT/US2018/012705, filed Jan. 5, 2018, 7 pages.
International Search Report and Written Opinion, dated Jul. 9, 2019, for PCT Application No. PCT/US2019/18987, 17 pages.
International Search Report and Written Opinion, dated May 3, 2019, for PCT Application No. PCT/US2019/19272, 16 pages.
International Search Report and Written Opinion, dated May 6, 2019, for PCT Application No. PCT/US2019/19264, 15 pages.
International Search Report and Written Opinion, mailed Jan. 3, 2019, for PCT Application No. PCT/US2018/056577, nine pages.
International Search Report, mailed Jun. 7, 2018, for PCT Application No. PCT/US2018/24185, filed Mar. 23, 2018, 2 pages.
International Search Report, mailed Mar. 19, 2018, for PCT Application No. PCT/US2018/012705, filed Jan. 5, 2018, 2 pages.
International Search Report, mailed Mar. 20, 2018, for PCT Application No. PCT/US2018/012703, filed Jan. 5, 2018, 2 pages.
International Search Report, mailed Mar. 23, 2018, for PCT Application No. PCT/US2018/012704, filed Jan. 5, 2018, 2 pages.
International Search Report, mailed Sep. 18, 2018, for PCT Application No. PCT/US2018/12116, filed Jan. 2, 2018, 2 pages.
Written Opinion of the International Searching Authority, mailed Jun. 7, 2018, for PCT Application No. PCT/US2018/24185, filed Mar. 23, 2018, 5 pages.
Written Opinion of the International Searching Authority, mailed Mar. 19, 2018, for PCT Application No. PCT/US2018/012705, filed Jan. 5, 2018, 6 pages.
Written Opinion of the International Searching Authority, mailed Mar. 20, 2018, for PCT Application No. PCT/US2018/012703, filed Jan. 5, 2018, 9 pages.
Written Opinion of the International Searching Authority, mailed Mar. 23, 2018, for PCT Application No. PCT/US2018/012704, filed Jan. 5, 2018, 6 pages.
EP2889642 Description translation, created Oct. 3, 2020 from application dated Nov. 11, 2014, 27 pp. (Year: 2020).
European Search Report, dated Jul. 17, 2020, for EP Application No. 18776977.3, twelve pages.
Extended European Search Report, dated Jul. 10, 2020, for EP Application No. 18736738.8, nine pages.
Extended European Search Report, dated Jul. 22, 2020, for EP Application No. 18736685.1, ten pages.
Final Office Action mailed Oct. 8, 2020, for U.S. Appl. No. 15/857,563, filed Dec. 28, 2017, thirteen pages.
Gunzung, Kim, et al. (Mar. 2, 2016). "A hybrid 3D LIDAR imager based on pixel-by-pixel scanning and DS-OCDMA," Proceedings of SPIE; [Proceedings of SPIE ISSN 0277-786X vol. 10524], SPIE, US, vol. 9751, pp. 975119-1-975119-8.
International Preliminary Report on Patentability mailed Apr. 30, 2020, for PCT Application No. PCT/US2018/056577, eight pages.
J. Gluckman. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, pp. 983203-983203.
Non-Final Office Action mailed Apr. 1, 2020, for U.S. Appl. No. 15/857,566, filed Dec. 28, 2017, twenty one pages.
Non-Final Office Action mailed Apr. 30, 2020, for U.S. Appl. No. 15/860,598, filed Jan. 2, 2018, thirteen pages.
Non-Final Office Action mailed Jun. 2, 2020, for U.S. Appl. No. 15/934,807, filed Mar. 23, 2018, thirteen pages.
Non-Final Office Action mailed Mar. 26, 2020, for U.S. Appl. No. 15/857,563, filed Dec. 28, 2017, twenty three pages.
Non-Final Office Action mailed Mar. 30, 2020, for U.S. Appl. No. 15/863,695, filed Jan. 5, 2018, eight pages.
International Search Report and Written Opinion, dated Jan. 17, 2020, for PCT Application No. PCT/US19/19276, 14 pages.
Non-Final Office Action mailed Dec. 16, 2020, for U.S. Appl. No. 15/857,566, filed Dec. 28, 2017, eight pages.
Notice of Allowance malled Dec. 2, 2020, for U.S. Appl. No. 15/863,695, filed Jan. 5, 2018, five pages.
Notice of Allowance, (corrected) mailed Jan. 8, 2021, for U.S. Appl. No. 15/863,695, filed Jan. 5, 2018, two pages.
Non-Final Office Action mailed Feb. 18, 2021, for U.S. Appl. No. 15/860,598, filed Jan. 2, 2018, thirteen pages.
Notice of Allowance mailed Mar. 26, 2021, for U.S. Appl. No. 15/857,566, filed Dec. 28, 2017, ten pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Johnson, Lee., "Parabolic Mirror: How It Works & Types (w/ Examples)", https://sciencing.com/parabolic-mirror-how-it-works-types-w-examples-diagram-13722364.html, Dec. 28, 2020, 14 pages.
Helser, George., "Laser damage threshold—Galvo Mirror vs Polygon mirror", https://precisionlaserscanning.com/2016/03/laser-damage-threshold-galvo-mirror-vs-polygon-mirror/, Mar. 25, 2016, 4 pages.
Office Action issued in Japanese Patent Application No. 2019-536925 dated Nov. 9, 2021, 8 pages.
"Fiber laser," Wikipedia, https://en.wikipedia.org/wiki/Fiber_laser, 6 pages.
European Search Report, dated Jun. 17, 2021, for EP Application No. 18868896.4, 7 pages.
Office Action Issued in Japanese Patent Application No. 2019-536019, dated Nov. 30, 2021, 6 pages.

* cited by examiner

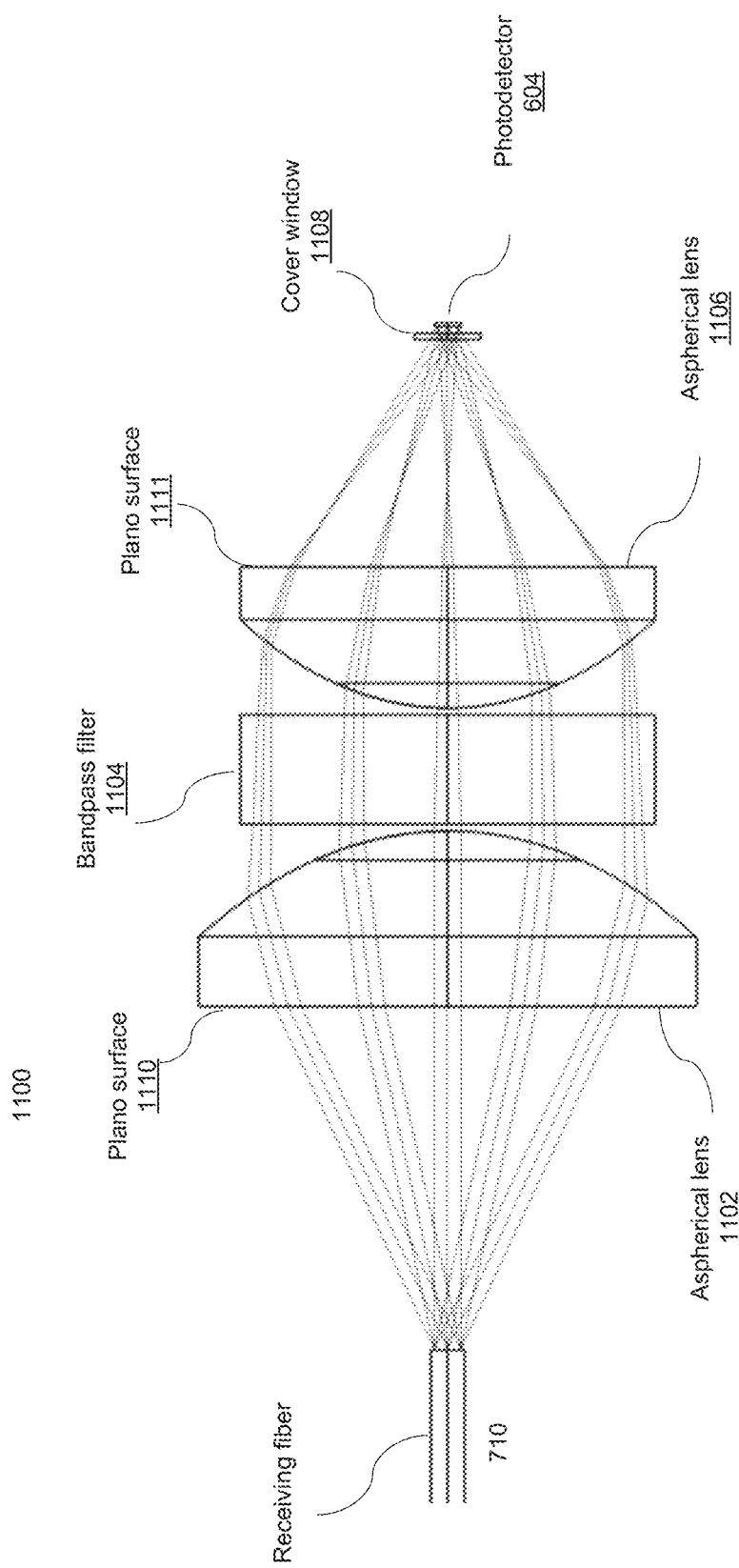

RECEIVE PATH FOR LiDAR SYSTEM

CROSS-REFERENCE TO RELATED APPLICATIONS

This application claims priority to U.S. Provisional Patent Application Ser. No. 62/634,084, filed Feb. 22, 2018, entitled "Receive Path for LiDAR System," the content of which is hereby incorporated by reference for all purposes.

FIELD

This disclosure relates generally to laser scanning and, more particularly, to using a fiber optic cable in the receive path of a laser scanning system.

BACKGROUND

Light detection and ranging (LiDAR) systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment

SUMMARY

The following presents a simplified summary of one or more examples to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) system comprises: a light source configured to generated a pulse signal from the LiDAR system; one or more mirrors configured to steer a returned light pulses associated with the transmitted pulse signal along an optical receive path; a fiber having a receiving end configured to receive the returned light pulse along the optical receive path; and a light detector configured to receive the returned light pulse from an end of the fiber opposite the receiving end.

In accordance with some embodiments, a light detection and ranging (LiDAR) system comprises: a light source configured to generated a pulse signal from the LiDAR system; one or more mirrors configured to steer a returned light pulses associated with the transmitted pulse signal along an optical receive path; a light detector configured to receive the returned light pulse; and a field lens positioned along the optical receive path, wherein the field lens is configured to redirect the returned light pulse from the one or more mirrors into the light detector.

In accordance with some embodiments, a light detection and ranging (LiDAR) system comprises: a light source configured to generate a pulse signal from the LiDAR system; one or more mirrors configured to steer a returned light pulse associated with the transmitted pulse signal along an optical receive path; a fiber having a receiving end configured to receive the returned light pulse along the optical receive path; and a light detector configured to receive the returned light pulse from an end of the fiber opposite the receiving end.

In accordance with some embodiments, a method comprises transmitting, using a light source, a pulse signal; steering, using one or more mirrors, a returned light pulse associated with the transmitted pulse signal along an optical receive path; redirecting, using a field lens positioned along the optical receive path, the returned light pulse; receiving, using a receiving end of a fiber, the returned light pulse from the field lens along the optical receive path; and receiving, using a light detector, the returned light pulse from an end of the fiber opposite the receiving end.

BRIEF DESCRIPTION OF THE DRAWINGS

The present application can be best understood by reference to the figures described below taken in conjunction with the accompanying drawing figures, in which like parts may be referred to by like numerals.

FIG. 11 depicts an exemplary optical coupling of the fiber to a photodetector of the exemplary LiDAR system.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some LiDAR systems use an open air optical path or optical path with one or more lenses to receive and optimize detection of returned pulse signals. This has a disadvantage in that the detection mechanism needs to either be close to where the returned pulse enters the system or a potentially complex system needs to be in place to redirect the returned pulse signal to the detector. In some embodiments of the present technology, an optical fiber is used to direct returned light pulses to a light detector. This way, the detector can be placed in an arbitrary location relative to the signal steering system that receives the return signal. Further, the detector can be placed fairly close to the exit end of the fiber, thus improving the integrity and amount of the detected light signals. Depending on how the returned light pulse is received by the LiDAR system, errors (e.g., walk-off error) that reduce signal strength or place more stringent tolerances on the system may be reduced. Some embodiments of the present technology use a field lens to redirect returned light pulses into an optical fiber core or directly into a light detector, thus reducing the errors due to walk-off of the pulses.

Figure 1:
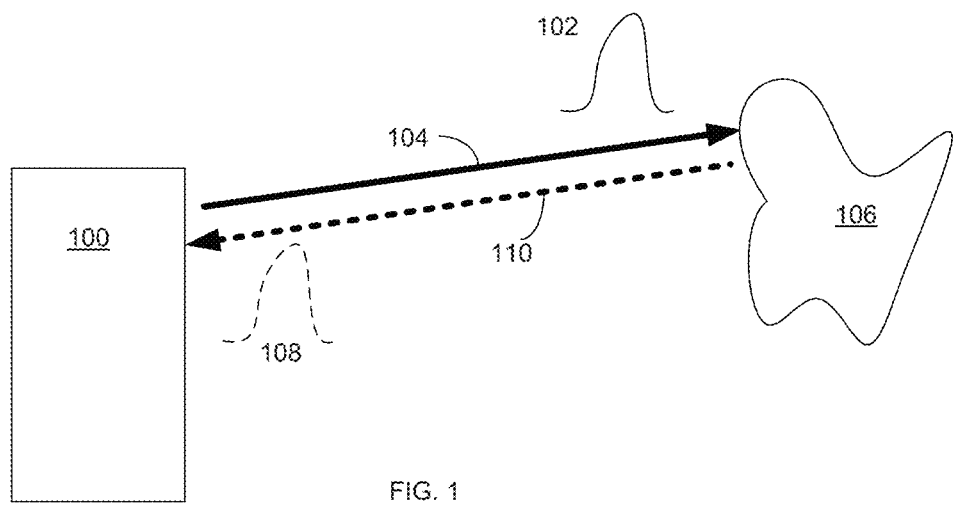
FIG. 1 illustrates an exemplary LiDAR system using pulse signal to measure distances to points in the outside environment.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed and/use derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
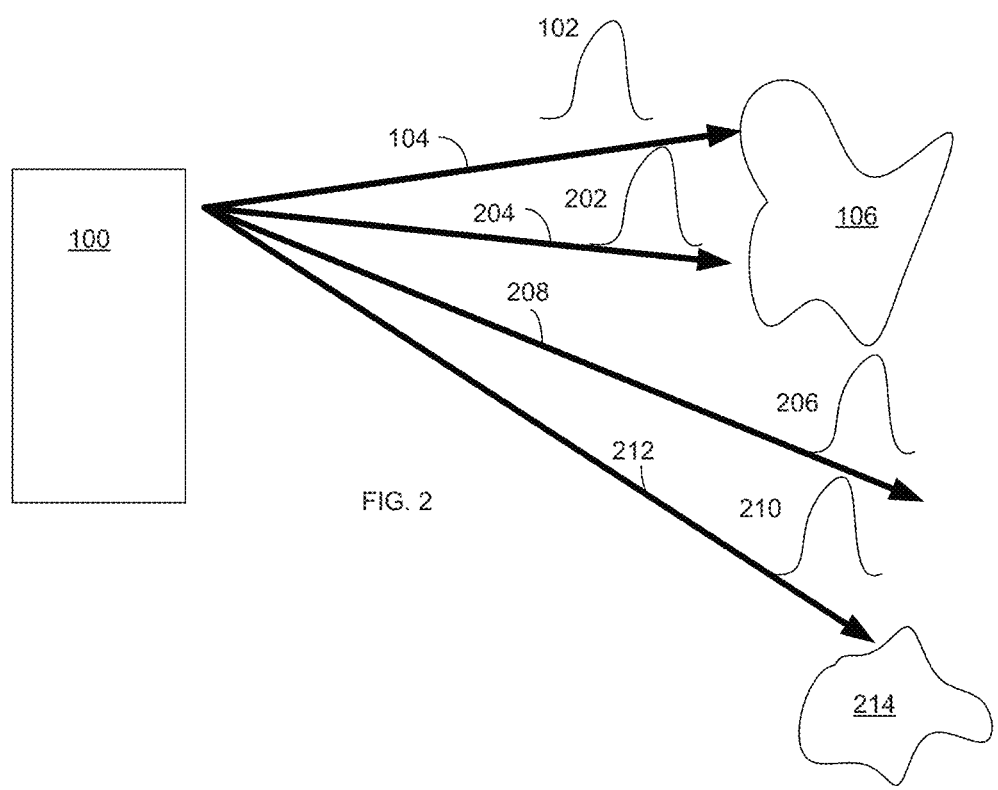
FIG. 2 illustrates the exemplary LiDAR system using pulse signal to measure distances to points in the outside environment.
Figure 3:
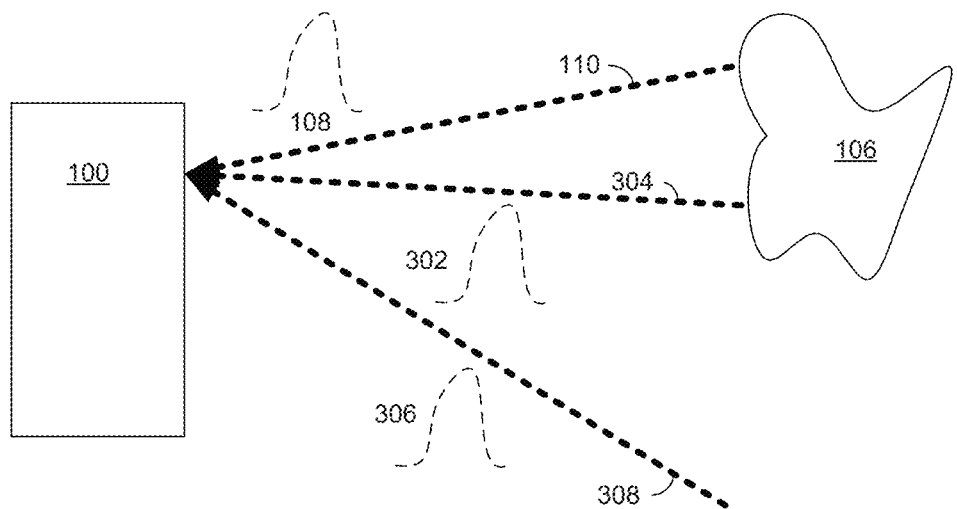
FIG. 3 illustrates the exemplary LiDAR system using pulse signal to measure distances to points in the outside environment.
Figure 3:
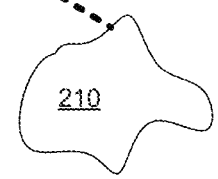

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
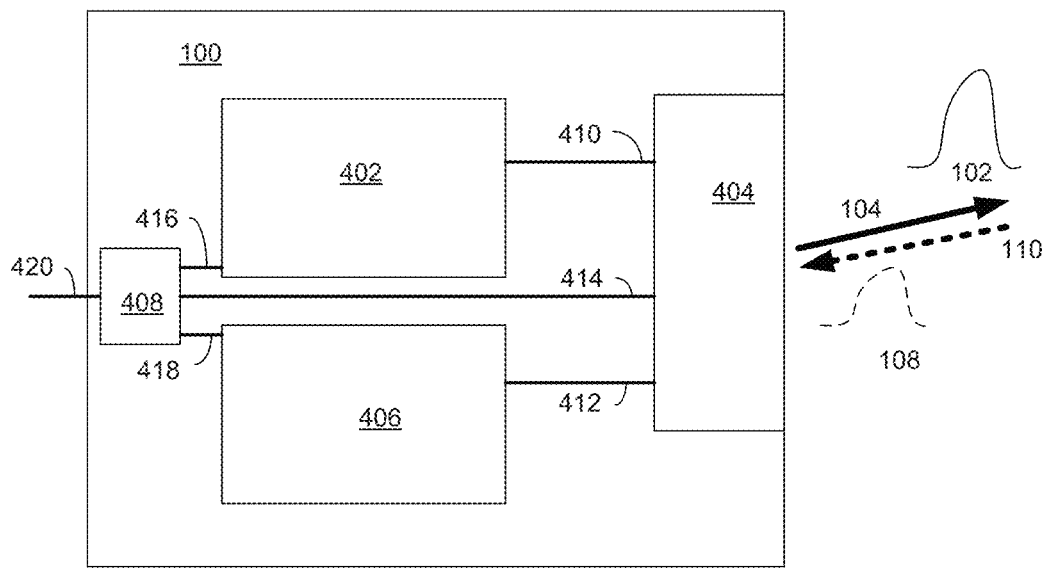
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional)

among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
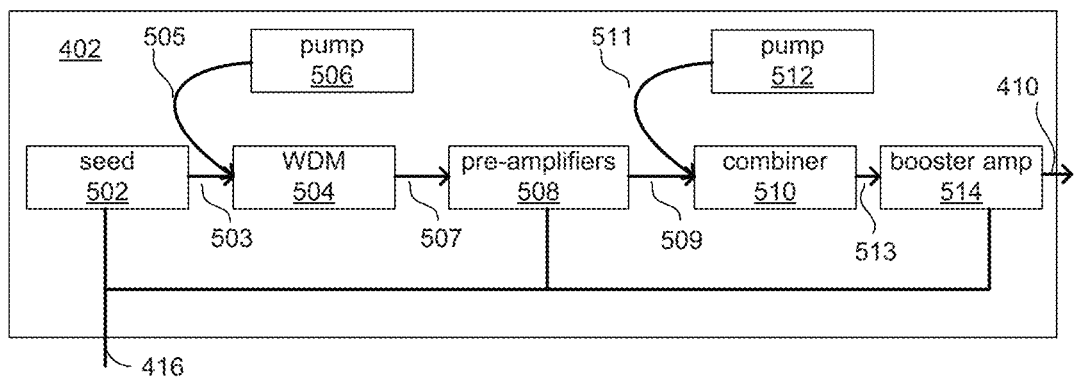
FIG. 5 depicts a light source of the exemplary LiDAR system.

FIG. 5 depicts a logical block diagram of one example of light source 402 that is based on a laser fiber, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. patent application Ser. No. 15/721,127 filed on Sep. 29, 2017, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
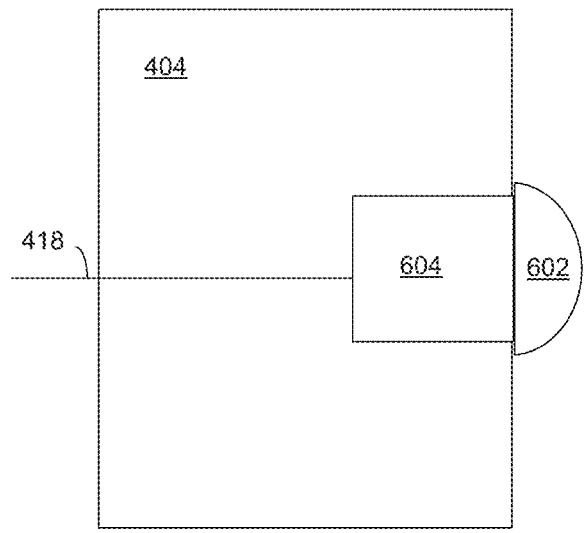
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 404 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
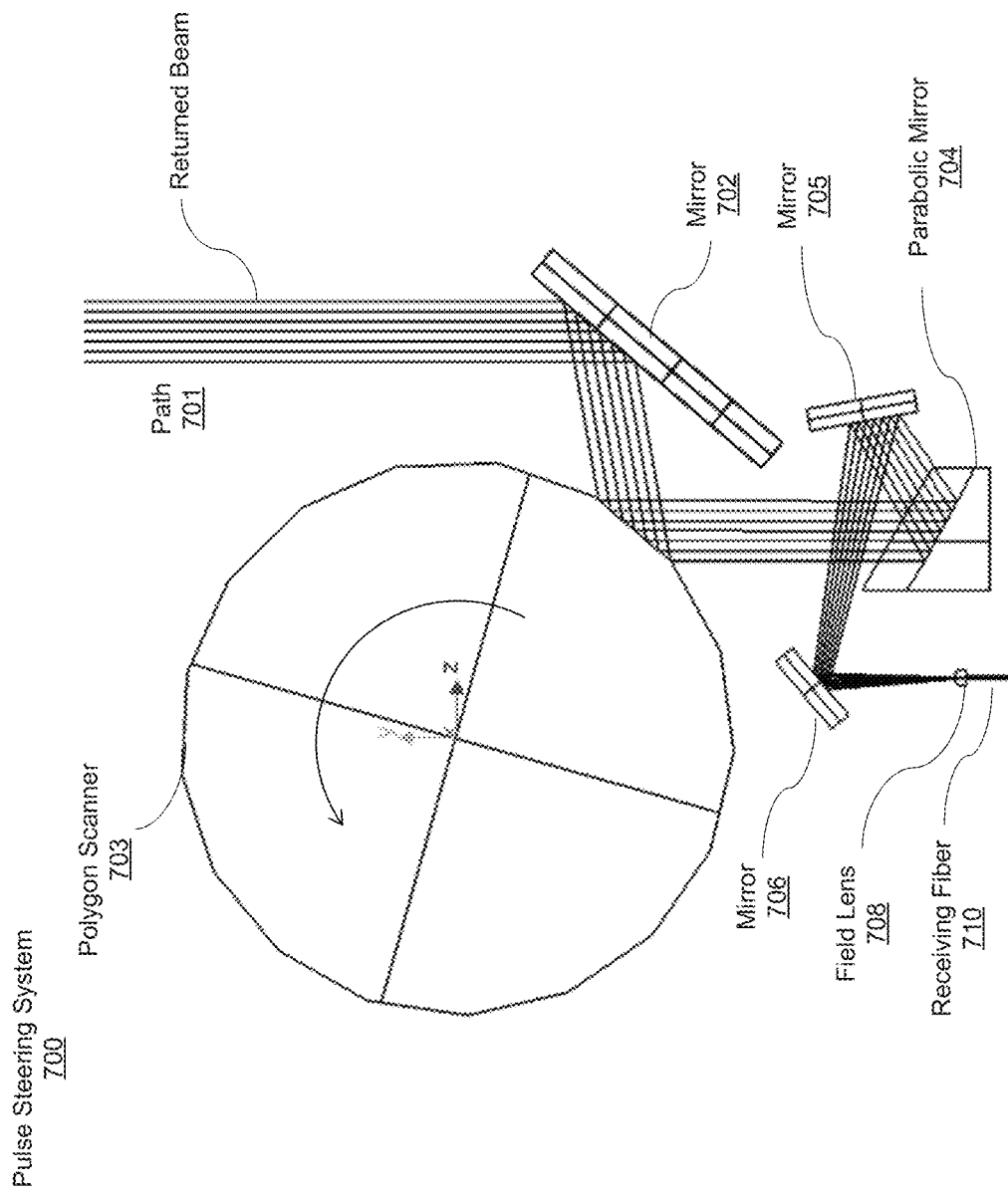
FIG. 7 depicts a steering system of the exemplary LiDAR system including a field lens and a fiber.

FIG. 7 depicts pulse steering system 700, which can be used to implement pulse steering system 404 discussed above. Pulse steering system 700 receives returned pulses along paths 701 and includes mirror 702, polygon scanner 703 (e.g., a reflective polygon rotating around the x-axis as shown in the figure), parabolic mirror 704 (e.g., a mirror focusing the pulse paths), mirror 705, and mirror 706. Part of pulse steering system 700 is also used to direct transmitting light pulses. For example, a fiber positioned with mirror 705, mirror 702, or in some location respective to polygon scanner 703 optionally provides light pulses that can be directed along different paths outside of the LiDAR system by pulse steering system 700.

In some embodiments, returned light pulses collected by pulse steering system 700 are redirected into an optical fiber (e.g., fiber 710), which carries the returned light pulses to a photodetector. This allows the pulse steering system to be located in an arbitrary position with respect to the light detector.

In some embodiments of the present technology, a lens, a lens group, or other optical element is used in the optical receive path to increase the tolerance of walk-off error of the returned pulses. For example, in FIG. 7, field lens 708 is placed in the path of return pulses traveling from mirror 706 to fiber 710. The use of a lens (e.g., a cylindrical lens) or other types of optical element mitigates beam walk-off in receiving channel.

Figure 8:
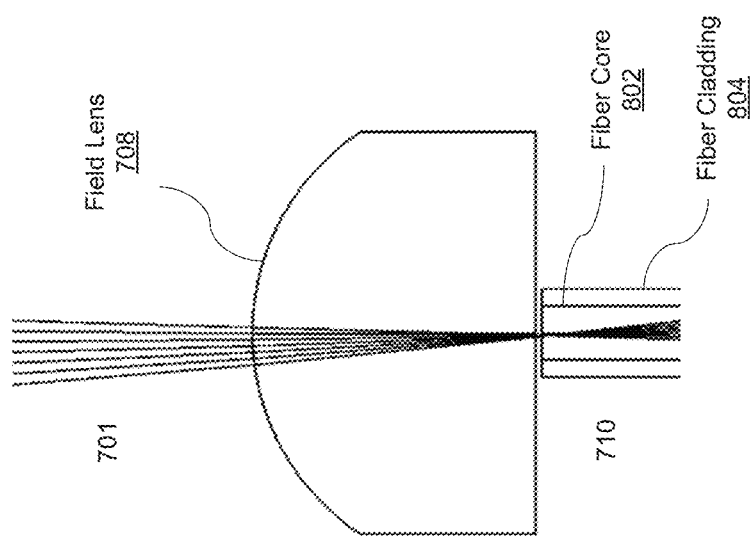
FIG. 8 depicts an exemplary configuration of the field lens and the fiber.

FIG. 8 depicts field lens 708 positioned to redirect returned light pulses traveling along paths 701 into the fiber core 802, which is surrounded by fiber cladding 804. Without field lens 708 (or other optical elements in other embodiments), light pulses may hit fiber cladding 804 or miss fiber 710 altogether. In FIG. 8, field lens 708 is a cylindrical lens that can be shaped into spherical, conic, or aspherical shapes. The cylindrical field lens can be made using traditional lens fabrication process such glass polishing and grinding, precision glass molding, or precision plastic molding.

In some embodiments of the present technology, the field lens 708 is configured to redirect returned light pulses traveling along paths 710 directly to a detector (e.g., an avalanche photodiode). In these embodiments, the steering system does not include a fiber. The returned light pulses are directed via the mirrors of the steering system to reach the detector. The detector can be placed fairly close to or directly on the field lens to improve the integrity of the detected signals.

Figure 9:
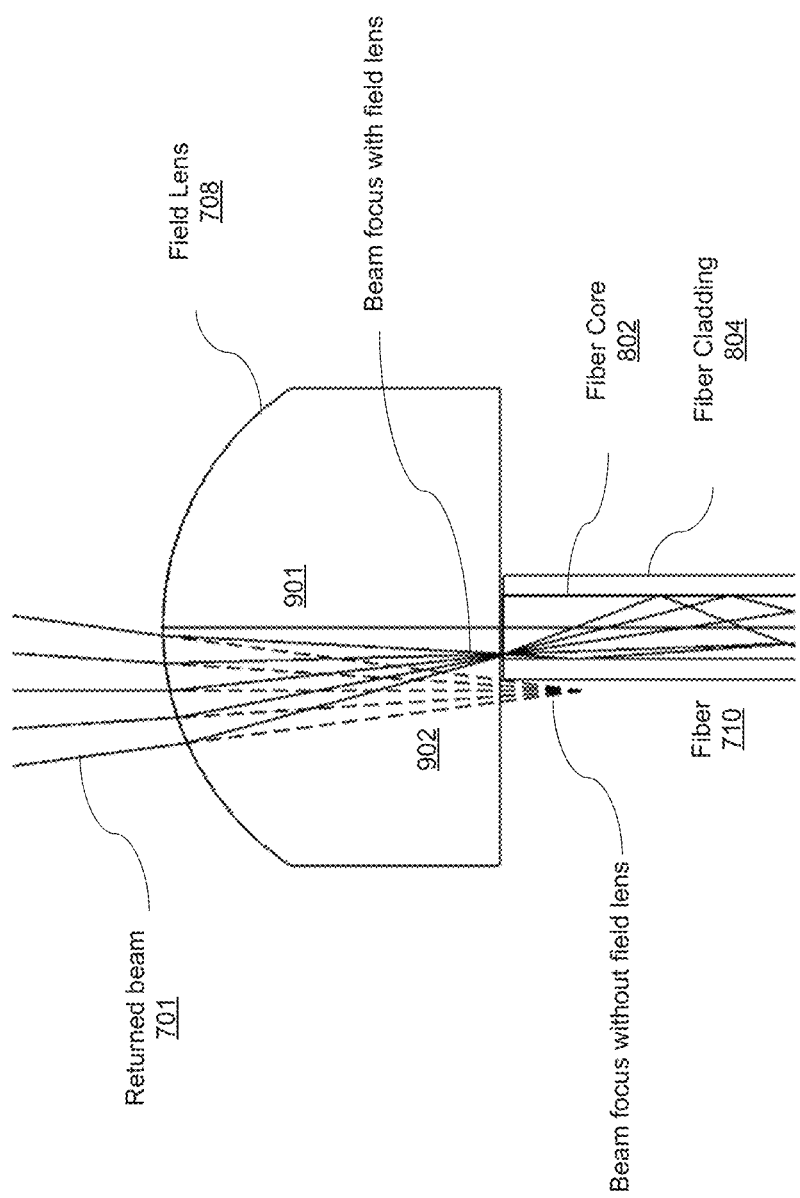
FIG. 9 depicts beam walk-off (in dashed line) that may occur in a steering system without the field lens and beam bending (in solid line) that may occur in a steering system with the field lens.

FIG. 9 depicts paths 901 of returned light pulses that are redirected by field lens 708 (or other elements). In contrast, paths 902 show that returned light pulses that are not redirected will completely miss fiber 710. These paths may be misaligned to fiber 710 (and more specifically to fiber core 802) because of various errors, process variations, environmental conditions, fabrication of the hardware such as the mirrors, and other effects that are difficult or impossible to fully account for. For example, polygon scanner 703 has a certain amount of jitter in its rotation speed, thus introducing walk-off of the pulses during normal operation of the steering system. When polygon scanner 703 transmits a pulse, the polygon continues to rotate, which means the optical receive path through the steering system is going to be slightly offset from the optical transmit path through the steering system. The amount of offset depends in part on how much the polygon rotated between when the pulse was transmitted and the return pulse was received. The speed of rotation can be controlled only within a certain margin. The distance (and therefore time) a pulse must travel depends on the distance to an object that scatters the pulse. These two variations determine, in-part, the amount of rotation that occurs after a pulse is transmitted and when a corresponding return pulse is received. The use of field lens 708 (or other components) in the optical path allows the system to tolerate more variation in the rotation (and other sources in error) by redirecting more of the returned pulses into fiber core 802.

Figure 10:
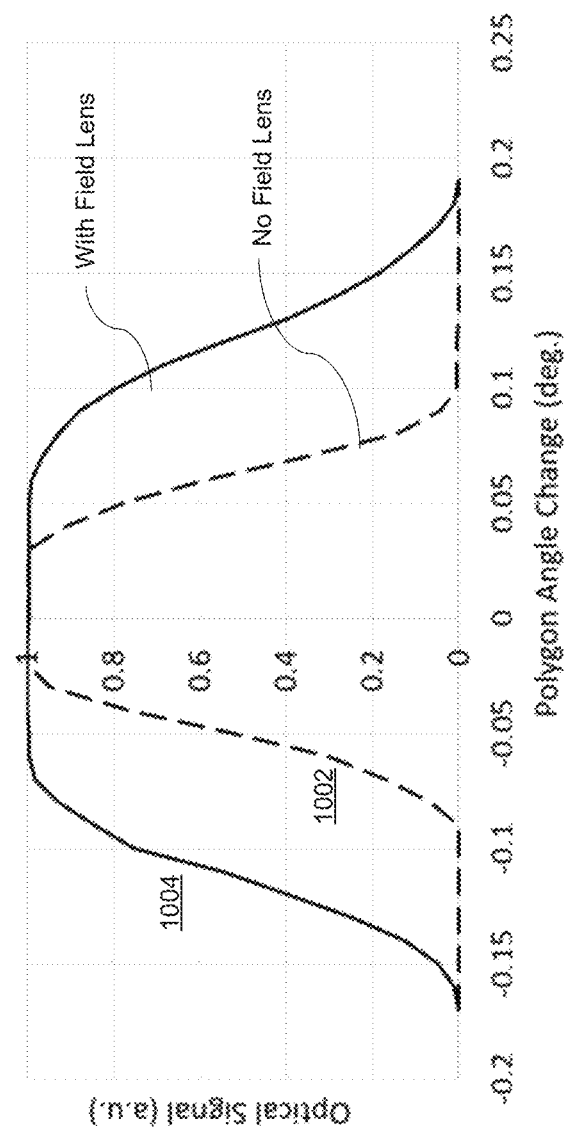
FIG. 10 illustrates the relationships between a returned optical signal and the angle change of a polygon in the exemplary steering system, with or without a field lens.

The improved walk-off characteristics of embodiments of the present technology are shown in FIG. 10. Curve 1004 shows that the window of polygon angles that provide for little to no degradation in the optical signal is about twice as large as the window provided without the field lens, as shown by curve 1002.

FIG. 11 shows one example of how the returned light pulses from the exit end of fiber 710 can be coupled to a photodetector 604 (FIG. 6) by a plurality of lenses, which may be spherical, conic, aspherical, or ball lens. Coupling 1100 includes aspherical lens 1102, bandpass filter 1104 (which is matched to the light source frequency), and aspherical lens 1106. The narrow bandpass filter is positioned between the lens stack to suppress light whose wavelength is outside the signal wavelength band. The multi-layer bandpass film can also be deposited onto the plano surface of either the first lens 1102 or the second lens 1106. Cover window 1108 protects photodetector 604, which can detect when a returned light pulse is received. The coupling optic shown in FIG. 11 is applicable in cases where the detecting area of the photodetector is different from fiber core area, especially where the detecting area of the photodetector is smaller than the fiber core area. Small area detectors are generally desirable because of fast transient response and lower cost. In some examples, the detecting surface of the photodetector has a similar or identical diameter (e.g., 200 μm) as the optical fiber core. In other cases where the detecting area of the photodetector can be chosen to be larger than the fiber core area, detector can be placed or glued directly onto the end facet of the fiber.

The invention claimed is:

1. A light detection and ranging (LiDAR) system comprising:
   a light source configured to generate a pulse signal from the LiDAR system;
   one or more mirrors configured to steer a returned light pulse associated with the transmitted pulse signal along an optical receive path wherein the one or more mirrors include a polygon scanner configured to rotate about an axis;
   a field lens positioned along the optical receive path, wherein the field lens is configured to redirect the returned light pulse to within a predetermined area;
   a fiber having a fiber core and a receiving end having a cross-sectional area that is equal to or greater than the predetermined area, and configured to receive the redirected returned light pulse from the field lens into the fiber core along the optical receive path wherein the fiber is configured to receive the redirected returned light pulse along a unidirectional receive path; and a light detector configured to receive the returned light pulse from an end of the fiber core opposite the receiving end, wherein the light detector receives the returned light pulse through a coupling optic wherein a detecting area of the light detector is approximately equal to or smaller than the cross-sectional area of the fiber core.

2. The LiDAR system of claim 1, wherein the field lens is configured to reduce walk-off error associated with the one or more mirrors.

3. The LiDAR system of claim 1, wherein the polygon scanner is also configured to direct the transmitted pulse signal from the LiDAR system.

4. The LiDAR system of claim 1, wherein the one or more mirrors include a parabolic mirror.

5. The LiDAR system of claim 1 wherein a variation in a speed of rotation of the polygon scanner is controlled within a known margin.

6. The LiDAR system of claim 5 further comprising:
an optical filter between at least one of the one or more lenses and the light detector.

7. The LiDAR system of claim 6, wherein the optical filter is a bandpass filter with a pass band encompassing a frequency of the pulse signal.

8. The LiDAR system of claim 1, wherein the coupling optic includes a first aspherical lens and a second aspherical lens.

9. The LiDAR system of claim 8, wherein a first multi-layer bandpass film is deposited on a plano surface of the first aspherical lens, and wherein a second multi-layer bandpass film is deposited on a plano surface of the second aspherical lens.

10. The LiDAR system of claim 1, wherein the light detector is placed onto an end facet of the fiber to directly receive the returned light pulse from the end of the fiber core opposite the receiving end.

11. The LiDAR system of claim 1, wherein the light detector is an avalanche photodiode.

12. The LiDAR system of claim 1, wherein the field lens is a part of a field lens group, wherein the field lens group is positioned along the optical receive path, and wherein the field lens group is configured to redirect the returned light pulse.

13. A method, comprising:
transmitting, using a light source, a pulse signal;
steering, using one or more mirrors, a returned light pulse associated with the transmitted pulse signal along an optical receive path wherein the one or more mirrors include a polygon scanner configured to rotate about an axis;
redirecting, using a field lens positioned along the optical receive path, the returned light pulse into a fiber having a fiber core, wherein the fiber is configured to receive the redirected returned light pulse to within a predetermined area, along a unidirectional receive path;
receiving, using a receiving end of the fiber core, wherein the fiber core has a cross-sectional area that is equal to or greater than the predetermined area, the returned light pulse from the field lens along the optical receive path; and
receiving, using a light detector, the returned light pulse from an end of the fiber core opposite the receiving end, wherein the light detector receives the returned light pulse through a coupling optic wherein a detecting area of the light detector is approximately equal to or smaller than the cross-sectional area of the fiber core.

14. The method of claim 13, wherein the field lens is configured to reduce walk-off error associated with the one or more mirrors.

15. The method of claim 13, wherein the light detector comprises an avalanche photodiode.

16. The method of claim 15, wherein the polygon scanner is also configured to direct the transmitted pulse signal from the LiDAR system.

17. The method of claim 13, wherein the one or more mirrors include a parabolic mirror.

18. The method of claim 13, wherein a variation in the speed of rotation of the polygon scanner is controlled within a known margin.

19. The method of claim 13, further comprising: positioning an optical filter between the coupling optic and the light detector.

20. The LiDAR system of claim 1, wherein the light detector directly receives the returned light pulse if the light detector has a larger area than the cross-sectional area of the fiber core.

* * * * *